C. BRADFIELD.
Harvester.
No. 13,480.
Patented Aug. 21, 1855.
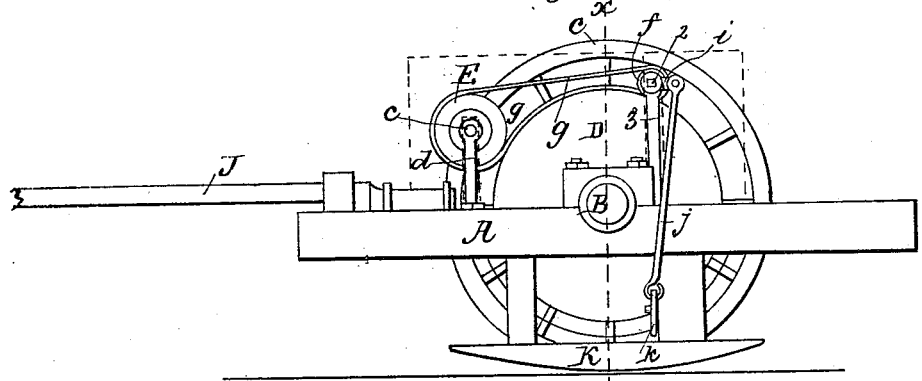
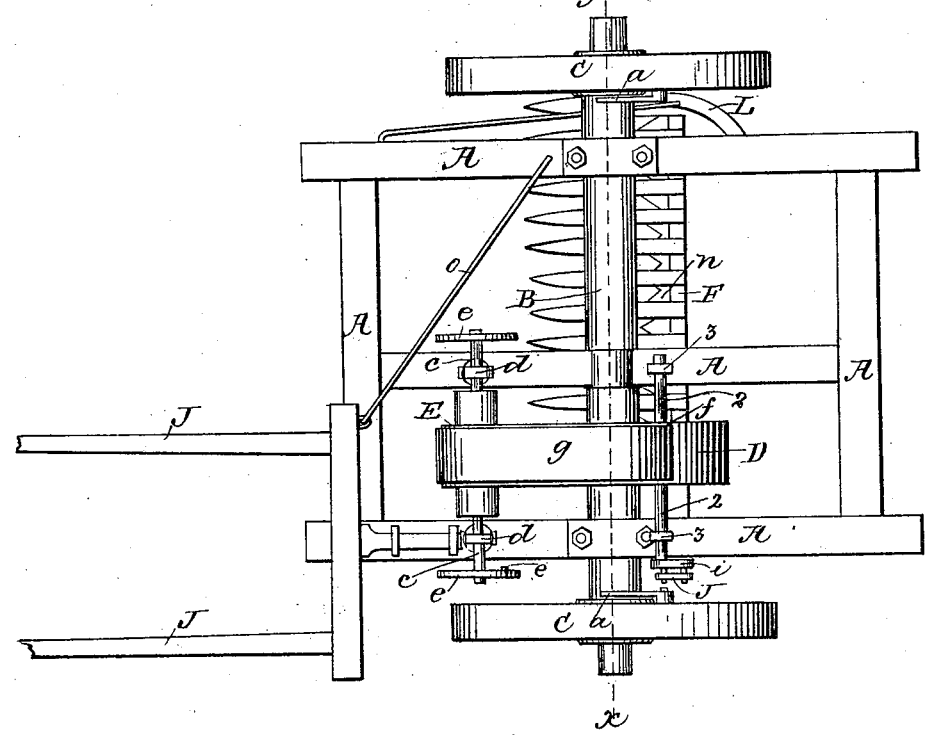
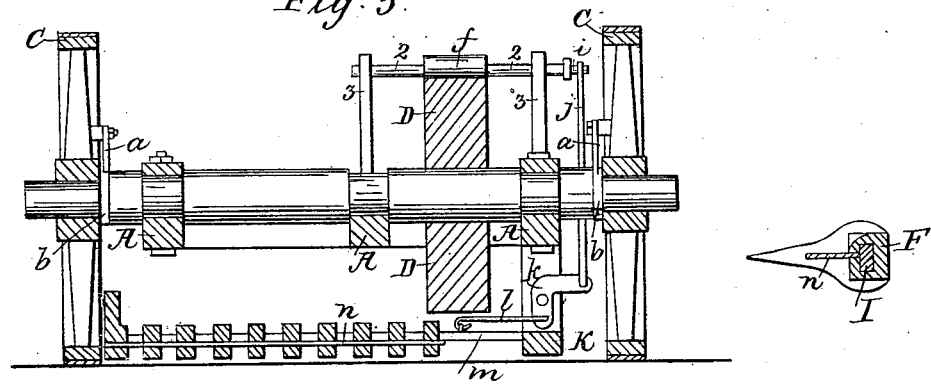

UNITED STATES PATENT OFFICE.

CHARLES BRADFIELD, OF PHILADELPHIA, PENNSYLVANIA.

IMPROVEMENT IN HARVESTERS.

Specification forming part of Letters Patent No. 13,480, dated August 21, 1855.

*To all whom it may concern:*

Be it known that I, CHARLES BRADFIELD, of the city of Philadelphia, in the county of Philadelphia and State of Pennsylvania, have invented certain new and useful Improvements in Harvesting-Machines; and I do hereby declare the following to be a full, clear, and exact description of the same, reference being had to the accompanying drawings, making a part thereof, in which—

Figure 1 represents a view from one of the sides of the machine, with one wheel removed to show the parts behind it. Fig. 2 represents a top view; and Fig. 3 represents a vertical transverse section taken at the red line $x\ x$ of Figs. 1, 2.

Similar letters in the several figures denote the same parts.

There is a great loss of power in driving harvesting-machines as at present constructed, whether driven by cogged gearing or belting. When cogged gearing is used there must be a multiplicity of wheels to get up the necessary vibration to the cutters, which begets much friction; or if, on the other hand, a small pinion is used with a greater number of revolutions, the friction is not lessened thereby. When belting is used as heretofore essayed, the pulleys or drums must be large, or else there is not contact-surface enough between them and the belts to allow the belt to hold and avoid slipping. Multiplied belts and pulleys must therefore be used to get up a quick vibration of the cutter; or else the pulleys must be removed at a great distance from each, which carries the cutters too far from the supporting-wheels, and could not be applied to the special construction of machines such as will be described.

The nature of my invention relates to the application of peculiar kind of hung belting, by means of which I can place the cutters immediately underneath the axle, and yet by a very small pulley and a single belt attain contact-surface enough between the belt and pulley to entirely avoid slipping, and yet get a high speed without much friction.

To enable others skilled in the art to make and use my invention, I will proceed to describe the same with reference to the drawings.

A is a rectangular frame, suitably supported on an axle, B, and pair of driving-wheels C. The wheels C are hung loose on the axle B, but by means of a pawl, $a$, on the wheels, and a suitable ratchet, $b$, on the axle B, near each wheel, said wheels and axle will revolve together when the machine is drawn forward, and the wheels will move independent of the axle when the machine is turned around. This ratchet-and-pawl connection is also very convenient when the machine is moved to or from the field, as by simply raising and holding up the pawls by pins the wheels will turn on the axles when the machine is drawn forward, and the cutters, &c., will remain inactive.

On the axle B is hung a large pulley, D, and on a shaft, $c$, in advance of the axle, is hung a smaller pulley, E, said shaft being supported in uprights $d$, and extending far enough beyond its supports to receive on its extreme ends two balance-wheels, $e\ e$.

Somewhat in rear of a perpendicular line passing through the center of the axle and below a line tangential to the top of the pulley D on the axle, is hung a small pulley, $f$, on a shaft, 2, supported in uprights 3, and around the before-described pulley E and the pulley $f$ passes an endless belt, $g$, which also passes over a portion of the perimeter of the large pulley D.

The pulleys E $f$ are so hung in relation to the large pulley D as that after the belt is placed properly they will pinch the belt against the large pulley, but acting as friction-wheels they cause the belt to take a rank hold on the large pulley without creating undue friction either on their own journals or those of the large pulley. As the belt impinges upon over two-thirds of the perimeters of the smaller pulleys, it has a very decided hold upon them, and they can consequently be very small. The size, however, is not so material with that E as with the other one, $f$, because, as the cutters are vibrated through $f$, it is desirable to have the proper speed on that pulley especially. The roller or pulley $f$ need not be much, if any, over one inch in diameter.

To the end of the shaft 2, which carries the pulley $f$, is placed a crank, $i$, to which is attached one end of a connecting rod or pitman, $j$, the other end of said pitman being connected to one arm of a bell-crank lever, $k$; and to the other arm of said bell-crank lever is connected a rod, $l$, by one of its ends, the other end of said rod $l$ being attached to the stock $m$, on which the cutters $n$ are placed, and through which connection and arrangement of parts the cutter stock or bar is vibrated.

The finger-bar F is suspended from the frame A by means of rods, bars, or chains, so that it may be made adjustable at the height to which the grain or grass is to be cut above the ground, and on this bar is placed the fingers G for dividing and holding the grass or grain for the proper action of the cutters. The finger-bar F is hollow, and the stock or bar I, to which the cutters (either sickle-edged or otherwise) n are attached, plays through said hollow finger-bar. The cutters n project through the finger-bar and the fingers also in a slot just sufficient to allow the blade to work, but close enough to prevent the grass or gum from working into said slot and choking the action of the knives. The belting and pulleys over which it runs may be incased in a box, as shown by the red lines in Fig. 1, to protect them from the weather or from grit and dirt. The supports of the pulleys E f, one or both, should be made adjustable in slots, so that by means of a nut and screw, or other equivalent device, the said pulleys may be adjusted for straining up the belt properly.

J are shafts for drawing the machine or guiding it, and o a brace-rod leading therefrom to the end of the machine, which runs in the standing grain or grass to counteract the side draft or drag of the machine.

K is a shoe on the end of the finger-bar, turned up somewhat on its lower side, so as to readily glide over the ground and grass; and at the other end of said finger-bar is placed a track-clearer, L, for turning the grass to one side to leave a clear track for the return-swath.

Having thus fully described the nature of my invention, what I claim therein as new, and desire to secure by Letters Patent, is—

The arrangement of the pulleys D E f on and near the axle, and the finger and cutter bar underneath the axle, when the cutters are operated from said pulleys through the intervention of an endless belt, g, cranks, pitman, and connecting-rod, substantially in the manner and for the purpose set forth.

CHAS. BRADFIELD.

Witnesses:
 THEODORE ASH,
 MICHAEL W. ASH.